United States Patent Office 3,164,618
Patented Jan. 5, 1965

3,164,618
ALKYLATED STEROIDS
Richard Rausser, Union, and Eugene P. Oliveto, Bloomfield, N.J., assignors to Schering Corporation, Bloomfield, N.J., a corporation of New Jersey
No Drawing. Filed May 8, 1958, Ser. No. 733,843
23 Claims. (Cl. 260—397.45)

This invention relates to a group of novel alkylated steroid compounds and to methods of preparing the same. More particularly, this invention relates to 16-alkyl-$\Delta^{1,4}$-pregnadienes and their halogenated derivatives, as well as certain novel $\Delta^4$-pregnenes which are useful in the preparation thereof.

This application is a continuation-in-part of now abandoned U.S. application, Serial No. 673,141, filed July 23, 1957, by Richard Rausser and Eugene P. Oliveto, the inventors herein, and entitled "Alkylated Steroids."

Heretofore, it has been known to prepare pregnenes such as cortisone and hydrocortisone, and pregnadienes, as, for example, prednisone and prednisolone as well as the corresponding 21-esters and 9-halo derivatives thereof. We have now discovered, however, that 16-alkylation of steroids possessing anti-inflammatory properties confers on the parent steroids the pronounced property of naturesis and diuresis. As a result of this unique and unexpected property, steroid compounds which possess anti-inflammatory properties but which are limited in their usefulness in the treatment of disease because of their inherent sodium retaining effects have their usefulness extended by 16-alkylation.

The novel compounds of our invention are represented graphically as follows:

A.

B.

wherein R is hydrogen or a carboxylic acyl radical and preferably one containing from 1 to 8 carbon atoms such as, for example, a lower alkanoyl radical, e.g. acetate, propionate, cyclopentyl, benzoate, phthalate, dimethyl acetate, trimethyl acetate, tert.-butyl acetate, phenoxy acetate, thiophene carboxylate, nicotinate and like substituents, R' is a lower alkyl group such as, for example, $\alpha$-methyl, $\beta$-methyl, $\alpha$-ethyl, $\beta$-ethyl, $\alpha$-propyl, $\beta$-propyl, $\alpha$-isopropyl, $\beta$-isopropyl, $\alpha$-butyl, $\beta$-butyl, $\alpha$-tertiary (tert.)-butyl, and $\beta$-tert.-butyl; X is O, (H,$\alpha$OH) and (H,$\beta$OH), and Y is hydrogen or a halogen having an atomic weight of less than 81, e.g. bromine, chlorine and fluorine and when X is (H,$\alpha$OH), Y must be hydrogen. Those compounds wherein X represents (H$\alpha$OH), although not therapeutically active per se, are convertible by known oxidative procedures into 11-keto compounds which possess physiological activity. Further, as noted above, the dienes as represented by Formula B above, manifest a markedly greater therapeutic activity than the $\Delta^4$-monoenes of Formula A. The $\Delta^4$-monoenes are, however, also valuable as intermediates in the preparation of the dienes of Formula B above. It is noted that the substitution of an $\alpha$-halogen atom for hydrogen at position 9 in the 16-alkylated glucocorticoids of applicants herein, will, as with those steroids previously known (e.g. prednisone, prednisolone and the like), enhance the anti-inflammatory properties thereof. Unfortunately, the addition of these 9$\alpha$-halogens has hitherto resulted in a marked increase in the salt-retaining properties of the known anti-inflammatory steroids, thus preventing their oral or injection administration in many instances, and making their use by topical application extremely hazardous. We have found unexpectedly, however, that the addition of a 16-lower alkyl group, and particularly the methyl radical, while inhibiting the increase in salt retention effected by the introduction of the 9$\alpha$-halogen, does not affect the enhanced therapeutic properties of these halo derivatives. Thus, these compounds can now be administered safely. Similarly, the salt-retaining properties of the non-halogenated steroids, such as, for example, cortisone and hydrocortisone, are markedly reduced. This is particularly surprising when it is noted that the substitution of a methyl group in the 2- or 6-position of such known steroids as 9$\alpha$-fluoro-hydrocortisone or 9$\alpha$-fluoro-prednisolone fails to alleviate their salt retaining characteristic, which prevents their employment for therapeutic applications such as disclosed herein.

It should be noted that, while the lower alkyl substituent can be introduced into the 16-position by a number of procedures which results in the formation of 16$\alpha$ and 16$\beta$ corticoids and before or after the introduction of the 9$\alpha$-halogen group, the following represents preferred sequences for preparing the compounds of our invention. Alternative procedures for introducing the 16-alkyl substituent such as, for example, the procedure which comprises reacting a 20-keto-16 dehydro steroid with a nitroalkane, followed by reduction, quaternization and pyrolysis, are also described hereinafter. Sequences A, B, and C illustrate desirable methods of preparation of the 16$\beta$-alkyl corticoids of our invention; sequence D a practicable procedure for obtaining the 16$\alpha$-alkyl corticoids of applicants' invention; and sequence E a more convenient mode of effecting the production of the 9$\alpha$-halogen derivatives of the 16$\alpha$-alkyl and 16$\beta$-alkyl steroids described in the initial sequences A, B, C and D. For purposes of illustration, the preferred methyl and acetate groups are employed in these sequences, as well as in the subsequent description thereof, as the 16-alkyl radical, and 21-acyl substituent, respectively, and the 9$\alpha$-bromo and 9$\alpha$-fluoro substituents as the 9$\alpha$-halogen radicals.

SEQUENCE A 16-pregnene-3$\alpha$-ol-11,20-dione 3-acetate ⟶

16-methyl-16-pregnene-3$\alpha$-ol-11,20-dione 3-acetate ⟶ 16$\beta$-methylpregnane-3$\alpha$-ol-11,20-dione 3-acetate ⟶

16$\beta$-methylpregnane-3$\alpha$,17$\alpha$-diol-11,20-dione ⟶ 16$\beta$-methylpregnane-3$\alpha$,17$\alpha$,21-triol-11,20-dione 21-acetate 16$\beta$-methylpregnane-17$\alpha$,21-diol-3,11,20-trione ⟶ 4-bromo-16$\beta$-methyl-pregnane-17$\alpha$,21-diol-3,11-20-trione 21-acetate 16$\beta$-methylcortisone 21-acetate ⟶ 16$\beta$-methylcortisone ⟶

16$\beta$-methylprednisone

SEQUENCE B

16$\beta$-methylpregnane-17$\alpha$,21-diol-3,11,20-trione 21-acetate ⟶ 2,4-dibromo-16$\beta$-methyl-pregnane.17$\alpha$,21-diol-3,11,20-trione 21-acetate 16$\beta$-methylprednisone 21-acetate

SEQUENCE C

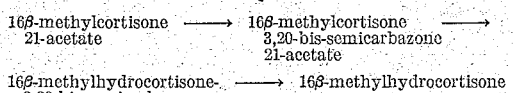
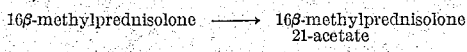

SEQUENCE D

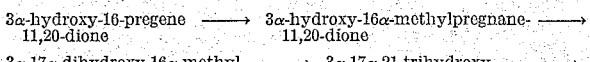
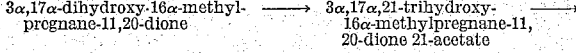
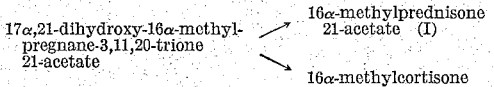
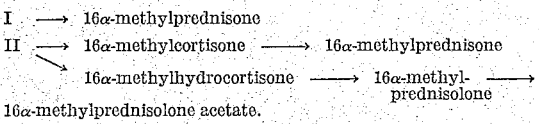

16α-methylprednisolone acetate.

SEQUENCE E (a)

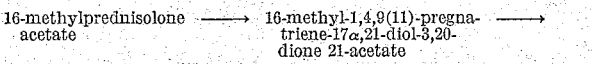
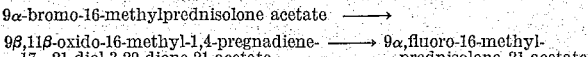
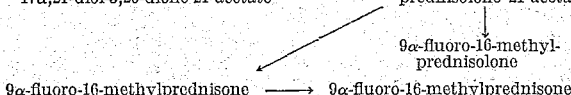

(b)

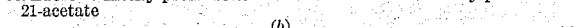
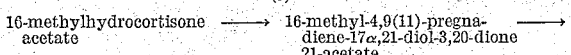
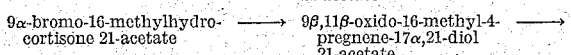
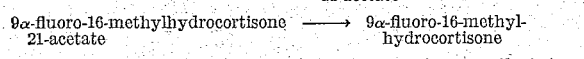

By way of further illustration, the 16β-lower alkyl (e.g. methyl) compounds of our invention described in reaction sequence A above are desirably prepared with the easily available substance 16-pregnene-3α-ol-11,20-dione 3-acylate (e.g. acetate). Reaction of this ester with diazomethane gives in excellent yield, the pyrazoline intermediate, which upon pyrolysis at, or above, its melting point is converted into 16-methyl-16-pregnene-3α-ol-11,20-dione 3-acetate. Where the 16β-ethyl, 16β-propyl, or 16β-butyl derivative is desired, for example, the corresponding diazoethane, diazopropane, diazobutane or the like is used to obtain the corresponding compounds. Although we prefer to pyrolize the pyrazoline by heating above its melting point, such pyrolysis may also be effected by heating the substance in a high boiling inert solvent, such as p-cymene, or tetralin and the like. The unsaturation in the D-ring is conveniently removed by reductive hydrogenation preferably in the presence of a catalyst, such as palladium, whereupon there is obtained 16β-methylpregnane-3α-ol-11,20-dione 3-acetate.

In order to introduce a hydroxyl group at C-17, we have found that the C-20 keto group of 16β-methylpregnane-3α-ol-11,20-dione 3-acetate can be easily converted into an enol-acetate by refluxing with acetic anhydride and a strong acid, such as p-toluenesulfonic acid, for example. We prefer not to isolate the enol-acetate but rather react said substance in situ with a peroxy-acid, such as peracetic acid, whereby a second intermediary non-isolated product, i.e. the 17,20-epoxide thereof, is obtained. Treatment of the reaction mixture with alkali hydrolyzes the epoxide in situ and thereby forms 16β-methylpregnane-3α,17α-diol-11,20-dione. In this procedure, whereby the hydroxyl group is introduced at C-17, other acetylating agents, such as isopropenyl acetate, may also be used in place of acetic anhydride. Furthermore, the strong acid catalyst is not necessarily limited to p-toluenesulfonic acid, since other strong acids such as perchloric acid are equally effective in producing the intermediate enol-acetate. As indicated above, the enol-acetate is converted to the respective 17,20-epoxide by means of a peroxy-acid, as exemplified by peracetic acid, perbenzoic acid, monoperphthalic acid, pertrifluoroacetic acid and the like.

Introduction of the 21 acetoxy group or other ester thereof is effected in the conventional manner, such as by bromination of the C-21 methyl group, followed by reaction of the bromo-compound with, for example, sodium or potassium acetate, whereby 16β-methylpregnane-3α,17α-21-triol-11,20-dione 21-acetate is formed. Although acetoxylation has been shown by way of illustration, it will be apparent to one skilled in the art that other acyloxylations, such as the introduction of a propionoxy group, for example, can be analogously effected.

In order to obtain the 3-keto-Δ⁴- or 3-keto-Δ¹,⁴-system, the saturated pregnane ester 16β-methylpregnane-3α,17α,21-triol-11,20-dione 21-acetate is further transformed as follows: the hydroxyl group at C-3 is converted to a keto group, preferably by means of N-bromoacetamide whereby 16β-methylpregnane-17α,21-diol-3,11,20-trione 21-acetate is produced. It is apparent that other equivalent oxidizing agents can be employed in this step, such as N-bromosuccinimide, chromium trioxide-pyridine, chromium trioxide-acetone-sulfuric acid mixture and the like. The Δ⁴-double bond is now conveniently introduced into the A-ring by brominating 16β-methylpregnane-17α,21-diol-3,11,20-trione 21-acetate in the conventional manner whereby the intermediary bromo-compound is formed, which may or may not be isolated. Although we prefer to halogenate with bromine, other halogenating agents such as chlorine are equally effective. Dehydrogenation of this 4-bromo intermediate, also, in a conventional manner such as by reaction with semicarbazide followed by hydrolysis of the resultant 3-monosemicarbazone, or by refluxing with dimethylformamide optionally in the presence of lithium chloride, or by refluxing with organic bases such as collidine, causes elimination of hydrogen halide and insertion of the Δ⁴-double bond, yielding 16β-methylcortisone 21-acetate. This compound can then be saponified to produce the diol-trione, 16β-methylcortisone, by reacting the former, that is, the 16β-methyl cortisone 21-acetate, with hydrolytic agents such as aqueous methanolic potassium bicarbonate or with such reagents as sodium carbonate, sodium hydroxide, sodium alkoxides (e.g. sodium ethoxide), and acids such as p-toluenesulfonic acid. 16β-methylcortisone can now be re-esterified at C-21 by introducing any desired acid residue. We have found that, as is generally known in the art, esterification further enhances the duration of activity of the steroid alcohol and provides for a compound which is more effectively administered parenterally. We have found that acid residues, such as obtained from acetic acid, propionic acid, trimethylacetic acid, t-butylacetic acid, cyclopentylpropionic acid, furoic acid, phenoxyacetic acid and the like, provide useful esters. Similarly, half-esters of dibasic acids, such as obtained from phthalic, succinic, tartaric, citric and the like, provide for esters which can be solubilized by formation of a salt of the free carboxyl group with an alkali metal, such as sodium. In place of the dibasic organic acids, there can be used inorganic acids, such as phosphate and the like, thus producing a dihydrogen phosphate ester which itself can be further solubilized by salt formation.

Introduction of the Δ¹-bond is preferably carried out by subjecting 16β-methylcortisone 21-acetate or 16β-methylcortisone to the microbiological action of a dehydrogenating microorganism. We prefer to utilize *Bacillus sphaericus* (American Type Culture Collection 7055) or *Corynebacterium simplex* (A.T.C.C. 6946) according to analogous procedures described in Belgian Patent No. 540,478. It is essential, however, that the compound subjected to fermentative dehydrogenation contain at least a 3-keto-$\Delta^4$-system and thus the first opportune time to insert the $\Delta^1$-bond is after the formation of 16β-methylcortisone or its 21-ester. There is thus produced 16β-methyl-1,4-pregnadiene-17α-21-diol-3,11-20-trione.

The dehydrogenation of the A ring whereby the $\Delta^1$-bond is inserted can also be accomplished by other known methods, such as by reacting the saturated pregnane ester, 16β-methylcortisone 21-acetate, or the pregnane, 16β-methylpregnane-17α,21-diol-3,11,20-trione 21-acetate with selenium dioxide for example, or with chloranil, at elevated temperatures or by the well-known methods of halogenation and dehydrohalogenation.

This latter dehydrogenative procedure is exemplified by reaction sequence B whereby the pregnane, 16β-methylpregnane-17α,21-diol-3,11,20-trione 21-acetate, is dihalogenated preferably with bromine, thus forming the intermediary 2,4 - dibromo-16β-methylpregnane-17α,21-diol-3, 11,20-trione 21-acetate. Didehydrobromination with basic agents, preferably dimethylformamide, produces the 21-acetate of 16β-methylprednisone which can be saponified by use of any of the hydrolytic agents described above, e.g. potassium bicarbonate, to form the corresponding C-21 alcohol. It is obvious that at the final state of 16β-methylprednisone, various ester groups may be introduced at C-21.

The foregoing reaction sequences and discussions have applied to the preparation of compounds containing a keto function at C-11. It is apparent that if any of the starting materials contains a hydroxyl group at C-11α, said group will be carried through the series of reactions. However, keeping in mind the ready availability of the original starting material, 16-pregnene-3α-ol-11,20-dione 3-acetate, we prefer to initially carry out the reactions so as to produce 11-keto substances and when required, reduce the 11-keto group to an 11-hydroxyl group preferably having the β configuration. Such a transformation is outlined in reaction sequence C whereby the 3,20-bis-semicarbazone of 16β-methylcortisone acetate is formed from the reaction of this latter ester with semicarbazide. Having now protected the sensitive 3,20-diketo groups, the 11-keto function is reduced with sodium borohydride in aqueous tetrahydrofuran, thus yielding the bis-semicarbazone of 16β-methylhydrocortisone. The substituted groups at C-3 and C-20 are removed in a conventional manner, for example, by means of pyruvic acid, or by hydrolytic procedures such as dilute hydrochloric acid or nitrous acid thus yielding 16β-methylhydrocortisone.

Other methods of protecting the 3-keto groups may be employed, such as forming a 3,20-bis-ethylene ketal and then reducing the 11-keto group by means of sodium borohydride, lithium borohydride, or lithium aluminum hydride and the like. Acid hydrolysis of the 11-hydroxy-bis-ketal so formed yields 16β-methylhydrocortisone.

16β-methylhydrocortisone can be converted to 16β-methylprednisolone by means of the microbiological fermentation or chemical methods described above for the conversion of 16β-methylcortisone to 16β-methylprednisone. Similarly, 16β-methylprednisolone can be esterified according to any of the well-known techniques so as to produce the corresponding 21-acetate, e.g., 16β-methylprednisolone 21-acetate.

Alternatively, 16β-methylprednisone 21-acetate itself can be converted to 16β-methylprednisolone 21-acetate by first selectively protecting the 3,20-diketo groups as described above for the mono-enes and then selectively reducing the 11-keto function.

The 16α-lower alkyl compounds of our invention are desirably prepared by the procedure illustrated in Sequence D above, wherein 3α-hydroxy-16-pregnene-11,20-dione is added to a standard Grignard reagent, such as for example, methyl magnesium iodide, prepared from methyl iodide and magnesium, and refluxed to effect the production of the corresponding saturated 16α-methyl derivative, 3α-hydroxy-16α-methyl pregnane-11,20-dione. The methyl iodide derivative is again employed merely for purposes of illustration, but it will be apparent that where it is desired to prepare other 16α-lower alkyl compounds such as the 16α-ethyl, 16α-isopropyl or 16α-tert.-butyl homologues, for example, the corresponding ethyl magnesium iodide, isopropyl magnesium iodide or tert.-butyl magnesium iodide or the bromide and chlorine equivalents thereof is employed as the Grignard reagent.

The produce of this Grignard reaction, 3α-hydroxy-16α-methyl pregnane-11,20-dione, is then hydroxylated by standard procedures at the C-17 position, as for example, by reaction with acetic anhydride and p-toluene sulfonic acid, followed by peracetic acid and then by alkaline hydrolysis to form 3α,17α-dihydroxy - 16α - methylpregnane-11,20-dione. Introduction of the C-21 acetoxy group, or other ester thereof, is accomplished by known methods, such as for example, by bromination of the C-21 methyl group in an inert solvent such as chloroform with the sequential reaction of this product with sodium or potassium acetate in acetone or dimethylformamide. The product thus formed is 3α,17α,21-trihydroxy-16α-methyl-pregnane-11,20-dione 21-acetate. The hydroxyl group at position 3 in this latter compound is then transformed to a keto group, preferably by means of N-bromoacetamide to cause the production of 17α,21-dihydroxy-16α-methylpregnane-3,11,20-trione 21-acetate. Other known equivalent oxidizing agents such as those described hereinabove for preparing the 3-keto derivative of the 16β-methyl compounds can, of course, also be employed. The $\Delta^{1,4}$-double bonds are then introduced into the A-ring by dihalogenation, e.g. dibromination of this 3-keto derivative by the rapid introduction of bromine in a suitable non-reactive organic solvent such as dioxane followed by dehydrohalogenation in a conventional manner such as by refluxing the brominated steroid with dimethylformamide in the presence of calcium carbonate and lithium chloride, or with collidine or the like, or by use of other standard procedures as described hereinabove with relation to the preparation of the 16β-methyldienes. The resultant product is 16α-methylprednisone 21-acetate.

Alternatively, 17α,21-dihydroxy - 16α-methylpregnane-3,11,20-trione 21-acetate can be modified by introduction solely of the $\Delta^4$-double bond to form 16α-methylcortisone acetate. This is normally accomplished by halogenation of the former compound (preferably with bromine in a medium such as tert.-butyl alcohol), at about 30° to 35° C. with subsequent dehydrohalogenation by conventional reaction, as with semicarbazide followed by hydrolysis of the resultant 3-mono-semicarbazone with pyruvic acid or the like. The 16α-methylcortisone acetate so formed or the corresponding diene, for example, 16α-methylprednisone 21-acetate can then be saponified by reaction with conventional hydrolytic reagents such as sodium or potassium bicarbonate as described hereinabove in connection with the corresponding 16β-methyl steroids to remove the acyl-radical at C-21 and form the alcohol, 16α-methylcortisone, or 16α-methylprednisone. These compounds can be re-esterified if desired to further enhance the duration of activity thereof as also described hereinabove with relation to the corresponding 16β-methyl corticoids. The 16α-lower alkyl substituted cortisone acylates such as the 16α-methylcortisone acetate can also be converted to 16α-methylhydrocortisone by reaction thereof initially with semicarbazide, for example, to produce the 16α-methylcortisone acetate, 3,20-bis-semicarbazone, which is reacted with a metal borohydride reducing agent such as sodium or potassium borohydride to reduce the C-11 keto group to the 11-β-hydroxy group while simultaneously saponifying the C-21 position to form 16α-methylhydrocortisone-3,20-bis-semicarbazone. The latter product is then hydrolyzed by conventional procedures, e.g. dilute aqueous hydrochloric acid, to form 16α-methylhydrocortisone. This latter intermediate can then be transformed microbiologically according to procedures analogous to those described in Belgian Patent No. 540,478 referred to previously, hereinabove, employing a dehydrogenating microorganism, e.g. *Corynebacterium simplex* (A.T.C.C. 6946), *Bacillus sphaericus* (A.T.C.C. 7055), to form the valuable anti-inflammatory steroid, 16α-methylprednisolone. The compound can then in turn be re-esterified, for example, to form an acylate such as 16α-methylprednisolone 21-acetate by reaction with acetic anhydride in a suitable non-reactive organic solvent such as pyridine or lutidine and subsequently crystallized out.

In one preferred method, as described in Sequence E above, the 9α-halogen atom, and preferably the 9α-fluorine atom, is introduced into the 16α-methyl and 16β-methyl monoenes and dienes-21 esters as represented, for example, by 16α-methyl and 16β-methyl prednisolone acetate or the corresponding monoenes, 16α-methyl or 16β-methyl hydrocortisone, by dehydrating 16α-methyl or 16β-methyl prednisolone acetate, for example, with an alkyl or aryl sulfonyl chloride, e.g. methane sulfonyl chloride, in alkaline organic media, for example, pyridine, to effect the production of the corresponding $\Delta^{9,(11)}$-derivative, e.g. 16α-methyl or 16β-methyl-$\Delta^{1,4,9(11)}$-pregnatriene-17α,21-diol-3,20-dione 21-acetate and 16α-methyl or 16β-methyl-$\Delta^{4,9(11)}$-pregnadiene-17α,21-diol-3,20-dione 21-acetate. For convenience in further describing this series of reactions, the α- or β- isomerism of the 16-methyl substituent will not normally be explicitly referred to as in Sequence E above since this characteristic does not affect the step-wise reactions nor do these steps affect the specific 16α or 16β-isomerism of the reactant alkylated steroid. Placement of a halogen, and preferably bromine at this point in the procedure at the 9α-carbon position is accomplished by conventional means, such as, for example, by reacting the $\Delta^{9,(11)}$-steroid with hypobromous acid which can be and indeed is preferably prepared in situ from the reaction of, for example, N-bromoacetamide and perchloric acid yielding directly the corresponding 9α-bromo-16-methylprednisolone 21-acetate, and 9α-bromo-16-methylhydrocortisone 21-acetate. Esters of these types are useful anti-inflammatory compounds and are at the same time readily converted by oxidation to the corresponding 11-ketones by known techniques such as, for example, with chromium trioxide in pyridine and readily hydrolyzed at the C-21 position by such standard hydrolytic agents as aqueous methanolic potassium bicarbonate, sodium carbonate, concentrated hydrochloric acid in methanol-chloroform or like substances as disclosed hereinabove, to prepare the corresponding 21-alcohols.

Again alternatively, the 9α-bromohydrins can be refluxed with mild alkali, such as illustratively, sodium acetate in methanol, to form the corresponding 9β,11β-oxido derivatives, 9β,11β-oxido-16-methyl-$\Delta^{1,4}$-pregnadiene-17α,21-diol-3,20-dione 21-acetate, and 9β,11β-oxido-16-methyl-$\Delta^4$-pregnene-17α,21-diol 21-acetate. These latter compounds are then reacted with hydrogen fluoride in chloroform with or without ethanol and/or tetrahydrofuran to cause the formation of 9α-fluoro-16-methylprednisolone acetate and 9α-fluoro-16-methyl-hydrocortisone acetate. Similarly the substitution of anhydrous hydrogen chloride for hydrogen fluoride in this reaction results in the production of the corresponding 9α-chloro derivatives. Again these compounds can be oxidized to the corresponding 11-ketones by standard agents, e.g. chromium trioxide or N-halosuccinimides, or hydrolyzed to the corresponding 21-alcohols by standard saponification procedures (e.g. aqueous methanolic potassium bicarbonate or concentrated hydrochloric acid in methanol). Thus the preferred halogenated compounds of our invention, 9α-fluoro-16-lower alkyl prednisolones and 9α-fluoro-16-lower alkyl prednisones and particularly 9α-fluoro-16α-methylprednisolone, 9α-fluoro-16α-methylprednisone, 9α-fluoro-16β-methylprednisolone and 9α-fluoro-16β-methylprednisone are prepared by these procedures.

As noted earlier, the compounds of our invention can be prepared by a number of alternative procedures. One of these, by way of illustration, results in the production of both the 16α-methyl and 16β-methyl steroids described herein and in which the 9α-halogen can be present in the starting steroid or added subsequently by the procedures described immediately above. Illustrative of these starting materials are 4,16-pregnadiene-21-ol-3,11,20-trione, 4,16-pregnadiene-11β,21-diol-3,20-dione, and the 9α-halogen (e.g. bromo-, chloro-, fluoro-) derivatives thereof. These 9α-halogen pregnadienes, e.g. the 9α-fluoro-pregnadienes, can be prepared, illustratively, from 9α-fluorohydrocortisone or 9α-fluorocortisone by reaction thereof with semicarbazide in methanol preferably in a molar ratio of about 1:2 of steroid to semicarbazide respectively to cause the formation of the 3,20-bis-semicarbazide which, in turn, is reacted with acetic anhydride, for example, and heated to effect the dehydration of the C-17 hydroxyl. The resultant product is reacted with pyruvic acid and p-toluenesulfonic acid to result in the preparation of the corresponding 16-dehydro-20-keto-21-hydroxy-9α-fluoro steroids, such as for example, the 9α-fluoro-4,16-pregnadiene-21-ol-3,11,20-trione or 9α-fluoro-4,16-pregnadiene-11β,21-diol-3,20-dione, referred to above. The reaction sequence for the preparation of the 16α-methyl and 16β-methyl steroids of applicants' herein from 9α-halogen and non-halogenated 20-keto-16-pregnenes such as 4,16-dienes will proceed in like manner by reaction thereof initially with nitroalkanes (e.g. nitromethane) in an organic base such as piperidine to form the corresponding 16α-nitromethyl derivative which can be reduced, e.g. with tin and hydrochloric acid to the 16α-aminomethyl steroid, which, in turn, is quaternized with methyl iodide and subsequently pyrolyzed to form the corresponding 16-methylene derivative, which, in turn, converts to the 16-methyl-20-keto-16(17)-dehydro compound. Peroxidation of this latter product with hydrogen peroxide will cause the formation of the 16α,17α-oxido-16β-methyl-20-keto steroid which when reacted with hydrobromic acid, for example, will form the corresponding bromohydrin which is debrominated to yield a mixture (separable by chromatography) of 16α-methyl and 16β-methyl derivatives of, for example, 4-pregnene-17α,21-diol-3,11,20-trione, 4-pregnene-11β,17α,21-triol-3,20-dione and their 9α-halo (e.g. fluoro) derivatives. These monoenes can be converted to the corresponding 1,4-dienes microbiologically employing, for example, the microorganism *Bacillus sphaericus* (A.T.C.C. 7055) of *Corynebacterium simplex* (A.T.C.C. 6946). These reaction steps are carried out by procedures well known to steroid chemists. It will, for example, be evident that, should higher homologues of nitromethanes be employed (e.g. nitroethane, 2-nitropropane, nitrobutane and the like) on a 16-dehydrosteroid such as 3α-acetoxy-16-pregnene-11,20-dione, the corresponding alkyl homologues will result in the C-16 position (e.g. 16-ethyl-16-dehydro-20-ketosteroids, 16-isopropyl-16-dehydro-20-ketosteroids, etc.). The 16-alkyl-16-dehydro-20-keto steroids resulting from the pyrolysis of the quaternized steroids can be converted to corticoids in the manner already described, e.g., hydrogenation of the double bond with palladium on carbon or Raney nickel, introduction of the 17-hydroxy group by means of enol acetylation and peroxidation (e.g., acetic anhydride and p-toluenesulfonic acid followed by treatment with peracetic acid), introduction of the 21-acetate by means of bromination and acetoxylation (sodium acetate in dimethylformamide) and elaboration of the A ring in the conventional manner to introduce the $\Delta^4$ or $\Delta^{1,4}$-double bond(s) and 3-keto group. Alternatively, they may be epoxidized with alkaline hydrogen peroxide to yield 16α,17α-epoxy-16β-alkyl-20-keto steroids. These are then treated with a hydrohalic acid such as hydrogen bromide and debrominated, e.g., with zinc dust or Raney nickel or palladium and hydrogen. This results in the formation of both 16α-alkyl-17α-hydroxy-20-keto steroids, and 16β-alkyl-17α-hydroxy-20- keto steroids. After separation, e.g., by chromatography, these are then handled in the usual fashion, e.g., the 21-acetate is introduced via bromination and acetoxylation, and the A ring elaborated via oxidation of the 3-hydroxyl (if present), followed by bromination-debromination.

Since the higher diazoalkanes are rather difficult to prepare, it is preferable to convert 16α-alkyl-20-keto steroids to 16β-alkyl-20-keto steroids by a relatively simple procedure. The 16α-alkyl steroids are brominated at position 17, e.g., with bromine in an inert solvent (e.g. pyridine), or with N-bromosuccinimide, and the resulting compound dehydrobrominated, e.g., with collidine or with dimethylformamide to give 16-alkyl-16-dehydro-20-keto steroids. Hydrogenation of these gives 16β-alkyl-20-keto steroids.

Thus far, we have described as starting materials only compounds which are available from bile acids. There are, however, several other classes of starting material which are extremely useful, e.g. diosgenin and smilagenin. For example, diosgenin is readily converted to 16-dehydropregnenolone which can be converted readily to 16α-methylpregnenolone by means of the Grignard reaction and to 16-methyl-16-dehydropregnenolone by means of the diazomethane procedure. The former compound is hydrogenated, e.g. by means of palladium catalyst, to 16α-methylallopregnane-3β-ol-20-one and the cortical side chain elaborated in the usual way (enol acetylation at C–17 and epoxidation to give the 17α-hydroxy-20-ketone followed by bromination and acetoxylation at C–21). The C–3 hydroxyl is oxidized to the ketone, a 2,4-dibromide is prepared using bromine and dioxane or other inert solvent and dehydrobromination is effected by means of collidine or dimethylformamide to yield 16α-methyl-$\Delta^{1,4}$-pregnadiene-17α,21-diol-3,20-dione 21-acetate. This can be hydroxylated at position C–11 to yield either 16α-methylprednisolone or 16α-methyl-11-epi-prednisolone. This last compound may be acetylated selectively at C–21 to yield a mono-acetate and then oxidized at C–11 to give 16α-methylprednisone 21-acetate. Also, 16α-methyl-11-epiprednisolone 21-acetate may be dehydrated at C–11 by tosylation of the C-11α-hydroxyl followed by treatment with sodium acetate to yield 16α-methyl-$\Delta^{1,4,9(11)}$-pregnatriene-17α,21-diol-3,20-dione 21-acetate, a compound previously described as an intermediate for the preparation of 9α-halo-16α-methylcorticoids.

Alternatively, 16α- or 16β-alkyl-allopregnane-17α,21-diol-3,20-dione or its 21-acetate can be hydroxylated in the 11-position, e.g. with *Rhizopus nigricans* (A.T.C.C. 6227) or *Curvularia lunata* (N.R.R.L 2380), the C–21 hydroxyl is acetylated and the 3-keto-$\Delta^4$- or 3-keto-$\Delta^{1,4}$-system introduced in the usual manner.

The 16 - methyl - 16 - dehydropregnenolone described above is hydrogenated to 16β-methylallopregnane-3β-ol-20-one. This is treated in an exactly analogous fashion to yield 16β-methyl-$\Delta^{1,4}$-pregnadiene - 17α,21 - diol-3,20-dione 21-acetate, 16β-methylprednisolone 21-acetate, 16β-methyl-11-epi-prednisolone 21-acetate, and 16β-methyl-$\Delta^{1,4,9(11)}$-pregnatriene-17α,21-diol-3,20-dione 21-acetate (a compound previously described as an intermediate for the preparation of 9α-halo-16β-methyl corticoids).

Other important starting materials are the 12-oxygenated sapogenins, such as hecogenin, rockogenin and gentrogenin. For example, hecogenin has been converted to 11-keto-16-dehydroallopregnane-3β-ol-20-one. A 16α-methyl substituent can be introduced by means of the Grignard reaction and the side chain and A ring elaborated in the usual manner to contain the $\Delta^4$- or $\Delta^{1,4}$-double bond(s) and 3-keto and 21-acyloxy or hydroxyl groups, or the 16β-methyl substituent can be introduced via the diazomethane reaction and the side chain and A ring elaborated again by these same procedures.

Certain of the novel compounds of our invention, that is, the 16α- and 16β-alkyl-substituted derivatives of cortisone, hydrocortisone, prednisone and prednisolone, nonhalogenated or halogenated in the 9α-position, as well as their C–21 esters possess, as has been noted above, valuable anti-inflammatory and diuretic (i.e., sodium and water excretory) properties (thus explicitly excepting applicants' novel 11α-hydroxy-16-alkylated steroids, which are, however, valuable as intermediates in the formation of the corresponding 11-keto steroids, e.g., 16-alkyl cortisone and 16-alkyl prednisone). The alkylated (notably the 16α-methyl and 16β-methyl-substituted) dienes with or without the 9α-halogen substituted are particularly valuable therapeutic agents possessing similar therapeutic effects in the treatment of inflammatory diseases, such as for example, arthritis, dermatitis, asthma, and the like, and are normally administered in a daily maintenance dosage range of 0.50 to 10 mg.; the preferred daily dosage of the non-halogenated dienes being from about 2 mg. to about 10 mg. and that of the halogenated, and preferably the 9α-fluoro-alkylated dienes being in the range of 0.5 mg. to 5.0 mg.

The non-halogenated 16α-alkyl and 16β-alkyl monoenes of our invention, are, in addition to being valuable intermediates in the formation of the corresponding dienes, also active as anti-inflammatory agents and in inhibiting renal tubular reabsorption of sodium. A daily dosage of 25 mg. to 100 mg. is recommended for oral administration of these monoenes to induce sodium and water diuresis, e.g. in the treatment of ascites, congestive heart failure and cyclical edema.

Similarly, the 9-halo-16α- and 9-halo-16β-alkylated monoenes of our invention are also useful as anti-inflammatory agents, since they manifest an enhanced activity in the treatment of such inflammatory diseases as arthritis, dermatitis, asthma, and the like. When administered orally, the recommended daily dosage is in the range of 4 mg. to 15 mg.

When treatment so indicates, these 16α- or 16β-alkylated dienes and monoenes can be administered parenterally in the form of therapeutically acceptable solutions and suspensions, e.g., in aqueous media, or where oral administration is indicated, can be incorporated into tablets (normally from about 0.50 mg. to 5 mg. per tablet), elixirs and other known pharmaceutical dosage forms by standard procedures. They can also be administered topically in the form of ointments or creams, or as solutions, e.g. in dimethyl acetamide or diethyl acetamide, or in the form of suppositories dissolved or suspended in a fatty or waxy vehicle which melts at approximately body temperature, or as aerosols when mixed with suitable materials, such as isopropyl myristate and dichloro difluoromethane (Freon).

The following examples are further illustrative of the invention:

Example 1

16β-METHYLCORTISONE 21-ACETATE (A) *Product from the reaction of 16-pregnane-3α,-ol-11,20-dione 3-acetate and diazomethane.*—A solution of 3.72 grams of 16-pregnane-3α-ol-11,20-dione 3-acetate in 5 ml. of methylene chloride is added to a solution of about 1 gram of diazomethane in 70 ml. of ether which had been cooled to −10° C. The mixture is kept at 0° C. for four hours, then allowed to warm up to room temperature. The resulting pyrazoline crystallizes directly from the reaction mixture to yield 3.32 g., M.P. 199–200° C. dec., [α]$_D$+149.6° (dioxane).

*Analysis.*—Calcd. for $C_{24}H_{34}O_4N_2$: C, 69.23; H, 8.27; N, 6.76. Found: C, 69.51; H, 7.98; N, 6.69.

(B) *16-methyl - 16 - pregnene-3α-ol-11,20-dione 3-acetate.*—The pyrazoline of Example 1A (3.00 g.) is heated under reduced pressure to about 210° C. until the evolution of nitrogen ceases. The resulting oil is cooled to room temperature, then crystallized by the addition of ether. The precipitate is filtered and dried, yielding 2.12 g. of 16-methyl-16-pregnene-3α-ol-11,20-dione 3-acetate, M.P. 163–166° C., [α]$_D$+69.9° (dioxane) λ max. 248 mμ (ε 10,800).

*Analysis.*—Calcd. for $C_{24}H_{34}O_4$: C, 74.57; H, 8.87. Found: C, 74.85; H, 8.55.

(C) *16β-methylpregnane-3α-ol-11,20-dione 3-acetate.*—A solution of 12.0 g. of the 16-pregnene compound of Example 1B in 250 ml. of glacial acetic acid is hydrogenated at room temperature and atmospheric pressure in the presence of 3.0 g. of 10% palladium on charcoal catalyst. After the reduction is completed (about 1.5 hours), the catalyst is removed by filtration, and the filtrate concentrated under reduced pressure to about 100 ml. The residue is poured into water, and the precipitated solid filtered, washed and dried, yielding 11.4 g. of impure 16β-methylpregnane-3α-ol-11,20-dione 3-acetate, M.P. 148–155° C. After recrystallization from acetone-hexane there is obtained 8.40 g. of the product of this Example 1C, M.P. 160–163° C., no U.V. absorption at 220–300 mu, $[\alpha]_D + 93.6°$ (dioxane).

*Analysis.*—Calcd. for $C_{24}H_{38}O_4$: C, 74.19; H, 9.34. Found: C, 74.37; H, 9.06.

(D) *16β - methylpregnane - 3α,17α-diol-11,20-dione.*—A solution of 6.77 g. of 16β-methylpregnane-3α-ol-11,20-dione 3-acetate, in 156 ml. of acetic anhydride containing 3.89 g. of p-toluene-sulfonic acid is kept at 100° C. for six hours; during which time about 16 ml. of distillate is removed every half hour by the application of vacuum. The resulting oily residue is dissolved in 80 ml. of benzene and washed three times with water, then with a solution of 1.55 g. of sodium acetate in 20 ml. of water. The benzene layer is dried over magnesium sulfate, and then stirred for 18 hours at 25° C. with a mixture of 0.52 g. of sodium acetate in 12 ml. of commercial 40% peracetic acid. Excess peracetic acid is then destroyed by the dropwise addition of a solution of 15.5 g. of sodium sulfite in 52 ml. of water, while maintaining the temperature between 10° C. and 20° C. An additional 1.57 g. of sodium sulfite is then added, and the mixture stirred overnight until a starch-iodide test is negative. The benzene layer is separated, washed three times with water, and evaporated. To the resulting residue which is dissolved in 345 ml. of methanol, there is added a solution of 3.62 g. of sodium hydroxide in 39.5 ml. of water, and the mixture refluxed for 15 minutes. After neutralization with 4 ml. of glacial acetic acid, the solution is concentrated under reduced pressure to a volume of about 50 ml. This concentrate is poured into a mixture of ice and water and the solid which precipitates is filtered and dried, yielding 6.69 g. of impure 16β-methylpregnane-3α,17α-diol-11,20-dione, M.P. 105–140° C. This is chromatographed on Florisil, and the material eluted with 33–50% ether hexane, is combined and crystallized from acetone-hexane, yielding 2.09 g. of 16β-methylpregnane-3α,17α-diol-11,20-dione, M.P. 181.5–185° C. $[\alpha]_D + 83.6$ (dioxane).

*Analysis.*—Calcd. for $C_{22}H_{34}O_4$: C, 72.89; H, 9.45. Found: C, 72.82; H, 8.25.

16β - methylpregnane-3α,17α-diol-11,20-dione 3-acetate is prepared by adding to 1 gram of the corresponding 16β-methylpregnane-diol a solution of 0.5 ml. of acetic anhydride in 2.3 ml. of pyridine. After standing one hour at room temperature, the reaction mixture is poured into ice and hydrochloric acid. The resulting solid is filtered, dried, and recrystallized from acetone-hexane to yield 16β - methylpregnane - 3α,17α-diol-11,20-dione 3-acetate, M.P. 169–172° C. Its infrared spectrum indicates the presence of an acetate, hyroxyl and two ketonic groups.

*Analysis.*—Calcd. for $C_{24}H_{36}O_5$: C, 71.25; H, 7.97. Found: C, 71.29; H, 8.92.

(E) *16β - methylpregnane - 3α,17α,21-triol-11,20-dione 21-acetate.*—A solution of 362 mg. of 16β-methylpregnane-3α,17α-diol-11,20-dione in 18 ml. of chemically pure (C.P.) chloroform (containing a few drops of chloroform previously saturated with hydrogen bromide) is brominated at −25° C. by the addition (over a three-hour period) of 165 mg. of bromine in 10 ml. of chloroform. After removal of the solvent under reduced pressure, 10 ml. of dimethylformamide and one gram of sodium acetate are added. The mixture is stirred at 60° C. for two hours, allowed to stand overnight at room temperature, then heated another two hours at 60° C. The mixture is then poured into water, and the precipitated solid filtered and dried, yielding 370 mg. of impure 16β-methylpregnane-3α,17α,21-triol-11,20-dione 21-acetate, M.P. 192–203° C. Recrystallization from acetone hexane gives 280 mg. of the product of this example, M.P. 99–205° C. The analytical sample, after another recrystallization, melts at 200–205.5° C.

*Analysis.*—Calcd. for $C_{24}H_{36}O_5$: C, 68.54; H, 8.63. Found: C, 68.79; H, 8.39.

(F) *16β-methylpregnane-17α,21-diol-3,11,20-trione 21-acetate.*—A solution of 180 mg. of 16β-methylpregnane-3α,17α,21-triol-11,20-dione 21-acetate, in 30 ml. of 80% acetone-water is cooled to 10° C. One drop of concentrated hydrochloric acid is added, along with 150 mg. of N-bromosuccinimide, and the mixture allowed to react 22 hours at 10° C. in the dark. Excess sodium sulfite solution is then added, and the mixture concentrated under reduced pressure to a small volume from which precipitates 120 mg. of impure 16β-methylpregnane-17α,21-diol-3,11,20-trione 21-acetate, M.P. 190–195° C. dec. Purification is effected by means of zinc dust in aqueous acetone containing 2 drops of acetic acid. The zinc is removed by filtration, the filtrate concentrated, and hot water added to crystallize 100 mg. of the product of this example, M.P. 198–202° C.

(G) *4β - bromo - 16β-methylpregnane - 17α,21 - diol-3,11,20-trione 21-acetate.*—A solution of 84 mg. of 16β-methylpregnane-17α,21-diol-3,11,20-trione 21-acetate in 3 ml. of tert.-butyl alcohol and 3 ml. of methylene chloride is brominated at 30–35° C. by the rapid addition of a solution of 32 mg. of bromine in 3 ml. of tert.-butyl alcohol. After bromination is complete (1¾ hours), the solution is evaporated to dryness under reduced pressure. The residue is slurried with water, filtered and dried to yield 90 mg. of 4β-bromo-16β-methylpregnane-17α,21-diol-3,11,20-trione 21-acetate M.P. 115–130° C. dec., which is of sufficient purity for the conversion described in the following procedure.

(H) *16β-methylcortisone 21-acetate.*—The 4β-bromo-16β-methylpregnane-17α,21-diol-3,11,20-trione 21-acetate of above Example 1G is dissolved in a mixture of 30 mg. of semicarbazide, 4 ml. of tert.-butyl alcohol and 2 ml. of methylene chloride, and stirred in a nitrogen atmosphere for two hours at 25–30° C. After removing the solvent under reduced pressure, the residue is dissolved in 5 ml. of 80% acetic acid-water along with excess 70% pyruvic acid, and the reaction mixture allowed to stand at room temperature for 20 hours. The solution is brought to about pH 7 with dilute (5%) sodium hydroxide, and then is extracted with methylene chloride. The organic extracts are evaporated to a residue, and the residue chromatographed on Florisil. Chrystalline material (25 mg.) obtained from the 50% ether-hexane and 100% ether eluates, on crystallization from acetone-hexane yields 20 mg. of 16β-methylcortisone 21-acetate, M.P. 198–208° C. $\lambda_{max.}^{MeOH}$ 238 m$\mu$ ($\epsilon$ 12,800)

*Example 2*

16β-METHYLCORTISONE

One gram of 16β-methylcortisone 21-acetate (prepared as in Example 1) is dissolved in 25 ml. of methanol and 5 ml. of water containing 0.2 g. of posassium bicarbonate. This solution is refluxed for ½ hour, then concentrated under reduced pressure. Water is added to the residue, and the resulting precipitate is filtered and dried. Crystallization from acetone-hexane gives 16β-methylcortisone.

*Example 3*

16β-METHYLHYDROCORTISONE (A) *16β-methylcortisone 3,20 - bis - semicarbazone.*—A mixture of 5.0 g. of 16β-methylcortisone, 8.3 g. of semicarbazide hydrochloride, 6 g. of pyridine, 50 ml. of water and 200 ml. of methanol is refluxed for 16 hours. The solution is concentrated to about 60 ml., then poured into water to precipitate 16β-methylcortisone-3,20-bis-semicarbazone.

(B) *16β - methylhydrocortisone 3,20 - bis - semicarbazone.*—A solution of 6.0 g. of the bis-semicarbazone of above Example 3A and 4 g. of potassium borohydride in 200 ml. of tetrahydrofuran and 100 ml. of water is refluxed for 6 hours. The solution is cooled, and acetic acid added to pH 5.5. The organic solvent is distilled and the solids in the residue are filtered to give 16β-methylhydrocortisone 3,20-bis-semicarbazone.

(C) *16β-methylhydrocortisone.*—Under a nitrogen atmosphere, 5.0 g. of the bis-semicarbazone of above Example 3B are dissolved in 250 ml. of 2.4 N hydrochloric acid. The solution is cooled to 5° C., then 2.5 g. of sodium nitrite in 25 ml. of water is added over a 15 minute period at 5° C. The reaction mixture is stirred an additional 30 minutes, then cooled to below 15° C., neutralized with 20% sodium hydroxide, and extracted several times with chloroform. The solvent is evaporated under reduced pressure to give a solid residue which, after crystallization from acetone-hexane, yields 16β-methylhydrocortisone.

*Example 4*

16β-METHYLHYDROCORTISONE 21-ACETATE

To one gram of 16β-methylhydrocortisone, prepared as in Example 3, is added 0.5 ml. of acetic anhydride in 2.3 ml. of pyridine. After standing for one hour at room temperature, the mixture is poured into ice and hydrochloric acid. The resulting precipitate is filtered and recrystallized from aqueous methanol to yield 16β-methylhydrocortisone 21-acetate.

*Example 5*

16α-METHYLCORTISONE 21-ACETATE (A) *16α-methylpregnane-3α-ol-11,20-dione.*—A mixture of 3.72 g. of 16-pregnene-3α-ol-11,20-dione in 20 ml. of dry toluene is added to a Grignard reagent prepared from 7 g. of methyl iodide and 1.2 g. of magnesium in 40 ml. of ether, and containing 200 mg. of cupric chloride. The reaction mixture is distilled until a vapor temperature of 100° C. is reached. The distillation is then stopped, and the reaction temperature maintained at 100° C. for five hours. The mixture is then cooled, poured onto ice and an aqueous solution of ammonium chloride, and the solvent layers separated. The organic layer is distilled in vacuo to an oily residue (3.98 g.) which is chromatographed on Florisil. The 20% ether-hexane eluates are combined and evaporated to give 2.08 g. of a residue which is crystallized from acetone-hexane to yield 16α-methylpregnane - 3α - ol - 11,20 - dione, M.P. 149–154° C., $[\alpha]_D + 100.5°$ (dioxane).

(B) *16α - methylpregnane - 3α,17α-diol-11,20-dione.*—16α-methylpregnane-3α-ol-11,20-dione (7.44 g.), prepared as in above Example 5A is dissolved in 156 ml. of acetic anhydride containing 3.89 g. of p-toluenesulfonic acid. The reaction mixture is heated to 100° C., and about 10 ml. of distillate removed in vacuo every 30 minutes. After 6 hours, the remaining oily residue is dissolved in 80 ml. of benzene, and the solution washed three times with water, and once with a solution of 1.55 g. of sodium acetate in 20 ml. of water. A mixture of 12 ml. of 40% peracetic acid containing 0.52 g. of sodium acetate is added to the benzene solution and the mixture stirred at room temperature for 19 hours. A solution of 15.5 g. of sodium sulfite in 80 ml. of water is added at a temperature below 25° C., then an additional 1.6 g. of sodium sulfite is added and the mixture stirred overnight. The solvent layers are separated. The organic layer is washed three times with water, dried over calcium chloride, filtered, and evaporated to an oily residue under reduced pressure. The residual oil is dissolved in 345 ml. of methanol and 39.5 ml. of water containing 3.62 g. of sodium hydroxide, and the mixture refluxed 15 minutes. After neutralizing the excess alkali with 5 ml. of acetic acid, the methanol is distilled in vacuo. Water is added to the resultant residue, and a solid (5.25 g., M.P. 173–179° C.) separates which, when filtered and crystallized from acetone, yields 2.36 g. of 16α - methyl-pregnane-3α,17α-diol-11,20-dione, M.P. 181.5–184° C., $[\alpha]_D + 74.4°$ (dioxane).

(C) *16α - methylpregnane-3α,17α,21-triol-11,20-dione 21-acetate.*—A solution of 362 mgm. of the 16α-methylpregnane-diol of Example 5B in 18 ml. of chloroform is brominated at −20 to −30° C. by the dropwise addition of 160 mg. of bromine in 10 ml. of chloroform over a 45 minute period. Stirring is continued an additional 20 minutes, then the solvent removed under reduced pressure at 10° C. The residue is dissolved in 10 ml. of dimethylformamide, one gram of sodium acetate added, and the reaction mixture stirred at 60° C. for 12 hours. The reaction mixture is then poured into 10 ml. of concentrated hydrochloric acid and ice, and the precipitated solid filtered, washed with water and dried: 250 mg., M.P. 150–158°. The filtrate is extracted with methylene chloride and the extracts evaporated to give an oily residue of 180 mg. The solid (250 mg.) and the oil (180 mg.) are combined and chromatograped on Florisil. Eluates of 40% ether-hexane are combined and distilled to a residue (110 mg., M.P. 140–155° C.) substantially of 16α-methylpregnane-3α,17α,21-triol-11,20-dione 21-acetate. This product is used without further purification as the starting compound in the procedure immediately following.

(D) *16α - methylpregnane - 17α,21-diol-3,11,20-trione 21-acetate.*—To a solution of 110 mg. of the product of above Example 5C in 2.5 ml. of 80% tert.-butyl alcohol, 1.0 ml. of glacial acetic acid and one drop of concentrated hydrochloric acid is added 100 mg. of N-bromoacetamide at 5° C., and the reaction mixture kept at −5° C. for 20 hours. Aqueous sodium bisulfite solution is added, and the mixture extracted with methylene chloride. The organic solvent extracts are evaporated to give a residue which is debrominated by treatment with zinc dust in acetone-acetic acid. After filtering the zinc from the reaction mixture, water is added to the filtrate. The resultant precipitate is filtered and dried to yield 40 mg. of 16α-methylpregnane-17α,21-diol-3,11,20-trione 21-acetate, M.P. 205–211° C.

(E) *4 - bromo - 16α - methylpregnane - 17α,21 - diol-3,11,20 - trione 21-acetate.*—16α-methylpregnane-17α,21-diol-3,11,20-trione (80 mg.), prepared as described in Example 5D is dissolved in 3 ml. of tert.-butyl alcohol and 3 ml. of methylene chloride and is brominated at 30–35° C. by the rapid addition of a solution of 32 mg. of bromine in 4 ml. of tert.-butyl alcohol. Bromination is complete in 2 hours, and the solution evaporated to dryness under reduced pressure. The resultant residue is slurried with water, filtered and dried to give 92 mg. of a solid of substantially 4-bromo-16α-methylpregnane-17α,21-diol, 3,11,20-trione 21-acetate, which is used without further purification in the procedure immediately following.

(F) *16α - methylcortisone 21 - acetate.*—4-bromo-16α-methylpregnane-17α,21-diol-3,11,20-trione 21-acetate (92 mg.) of above Example 5E is dissolved in a mixture of 30 mg. of semicarbazide, 4 ml. of tert.-butyl alcohol and 2 ml. of methylene chloride, and stirred in a nitrogen atmosphere for two hours at 25–30° C. The solvent is removed in vacuo and the resultant residue dissolved in 5 ml. of 80% acetic acid-water, along with an 8 molar excess of 70% pyruvic acid with respect to the molar quantity of the 4-bromo-16α-methylpregnane starting compound. The reaction mixture is allowed to stand at room temperature for 20 hours. Dilute (5%) aqueous sodium hydroxide is added until the reaction mixture is at about pH 7, then the solution is extracted with methylene chloride. The organic extracts are evaporated to a residue which is chromatographed on Florisil. The 50% ether-hexane eluates and the 100% ether eluates are combined and evaporated to a crystalline residue (25 mg.) which is crystallized from acetone-hexane to give 20 mg. of 16α-methylcortisone 21-acetate, $$\lambda_{max.}^{MeOH} \ 238, \ m\mu \ (\epsilon \ 14,800)$$

Example 6

16α-METHYLCORTISONE 21-ACETATE

16α-methylcortisone 21-acetate (0.5 g.), prepared as in Example 5, is dissolved in 20 ml. of methanol and 2 ml. of water containing 0.1 g. of potassium bicarbonate. The solution is refluxed for ½ hour, then concentrated to ½ the volume in vacuo, and water added. The precipitated solid is filtered, dried, and crystallized from methanol to yield 16α-methylcortisone, $$\lambda_{max.}^{MeOH} \ 238 \ m\mu \ (\epsilon \ 15,200)$$

Example 7

16α-METHYLHYDROCORTISONE (A) *16α-methylcortisone 21-acetate 3,20-bis-semicarbazone.*—A mixture of 16α-methylcortisone 21-acetate (2.5 g.), prepared as in Example 5, 4.2 g. of semicarbazide hydrochloride, 3 g. of pyridine, 25 ml. of water and 100 ml. of methanol is refluxed for 16 hours. The solution is concentrated to about 30 ml., then poured into water to precipitate an almost quantitative yield of 16α-methylcortisone 21-acetate 3,20-bis-semicarbazone which is filtered and dried, and used without further purification in the procedure immediately following.

(B) *16α - methylhydrocortisone 3,20 - bis-semicarbazone.*—A solution of 3.0 g. of the bis-semicarbazone of Example 7A and 2 g. of potassium borohydride in 100 ml. of tetrahydrofuran and 50 ml. of water is refluxed for 3 hours. The solution is cooled, and acetic acid added to pH 5.5. The organic solvent is removed by distillation, and the solids collected by filtration to give 16α-methylhydrocortisone 3,20-bis-semicarbazone which is used without further purification in the procedure immediately following.

(C) *16α-methylhydrocortisone.*—Under a nitrogen atmosphere, 5.0 g. of the bis-semicarbazone of Example 7B is dissolved in 250 ml. of 2.4 N hydrochloric acid. The solution is cooled to 5° C., and a solution of 2.5 g. of sodium nitrite in 25 ml. of water is added at 5° C. over a 15 minute period. The reaction mixture is stirred an additional 30 minutes, and then is brought to neutrality with 20% sodium hydroxide, at a temperature below 15° C. The reaction mixture is extracted several times with chloroform. The chloroform extracts are combined and distilled in vacuo to a solid residue which, when crystallized from acetone yields 16α-methylhydrocortisone, $$\lambda_{max.}^{MeOH} \ 240 \ m\mu \ (\epsilon \ 14,700)$$

Example 8

16α-METHYLHYDROCORTISONE 21-ACETATE

16α-methylhydrocortisone (100 mg.), prepared as in Example 7, is dissolved in 2 ml. of pyridine containing 100 mg. of acetic anhydride and is allowed to stand at room temperature for one hour. The reaction mixture is poured into ice and hydrochloric acid, and a solid precipitates which is filtered and crystallized from aqueous methanol to yield 16α-methylhydrocortisone 21-acetate, $$\lambda_{max.}^{MeOH} \ 240 \ m\mu \ (\epsilon 15,000)$$

Example 9

16α-n-BUTYLCORTISONE 21-ACETATE (A) *16α - n-butylpregnane - 3α-ol-11,20-dione.*—16α-pregnene-3α-ol-11,20-dione is reacted with n-butyl-iodide and magnesium in the manner of Example 5A to yield 16α-n-butylpregnane-3α-ol-11,20-dione, which is crystallized from acetone-hexane.

(B) *16α - n-butylpregnane-3α,17α-diol-11,20-dione.*—16α-n-butylpregnane-3α-ol-11,20-dione, prepared as in Example 9A, is first reacted with p-toluenesulfonic acid in acetic anhydride, then with 40% peracetic acid and sodium acetate, and finally with aqueous sodium hydroxide in the manner described in Example 5B. A solid product is obtained which, when crystallized from acetone yields 16α-n-butyl-pregnane-3α,17α-diol-11,20-dione.

(C) *16α - n-butylpregnane-3α,17α,21-triol-11,20-dione 21 - acetate.*—16α-n-butylpregnane-3α,17α-diol-11,20-dione, prepared as in Example 9B, is brominated and then treated with sodium acetate in dimethylformamide in the manner of Example 5C. The reaction product is isolated and purified in the manner described to give 16α-n-butylpregnane-3α,17α,21-triol-11,20-dione 21-acetate.

(D) *16α - n - butylpregnane-17α,21-diol-3,11,20-trione 21 - acetate.*—16α-n-butylpregnane-3α,17α,21-triol-11,20-dione 21-acetate, prepared as in Example 9C, is reacted with N-bromoacetamide, and the resultant product isolated and purified in the manner of Example 5D to yield 16α - n-butylpregnane-17α,21-diol-3,11,20-trione 21-acetate.

(E) *4-bromo-16α-n-butylpregnane-17α,21-diol-3,11,20-trione 21 - acetate.*—16α - n-butylpregnane-17α,21-diol-3,11,20-trione 21-acetate, prepared as in Example 9D, is brominated and the product isolated in the manner of Example 5E, to give 4-bromo-16α-n-butylpregnane-17α,21-diol-3,11,20-trione 21-acetate which is used without purification in the following reaction.

(F) *16α-n-butylcortisone 21-acetate.*—The 4-bromopregnane, prepared in above Example 9E, is reacted with semicarbazide, then with acetic acid and pyruvic acid in the manner described in Example 5F. The product is isolated and purified in the described manner to yield 16α-n-butylcortisone 21-acetate, $$\lambda_{max.}^{MeOH} \ 238 \ m\mu \ (\epsilon 14,800)$$

Example 10

16α-n-BUTYLCORTISONE

16α-n-butylcortisone 21-acetate, prepared as in Example 9, is hydrolyzed with potassium bicarbonate in methanol and water in the manner of Example 6 to give 16α-n-butylcortisone, $$\lambda_{max.}^{MeOH} \ 238 \ m\mu \ (\epsilon 15,000)$$

Example 11

16α-n-BUTYLCORTISONE 21-n-BUTYRATE

16α-n-butylcortisone (100 mg.) prepared as in Example 10, is dissolved in 2 ml. of pyridine containing 100 mg. of butyric anhydride, and left at room temperature for one hour. The reaction mixture is then poured into ice-hydrochloric acid. A precipitate forms which is filtered and crystallized from aqueous methanol to give 16α-n-butylcortisone 21-n-butyrate, $$\lambda_{max.}^{MeOH} \ 238 \ m\mu \ (\epsilon 14,500)$$

Example 12

9α-BROMO-16β-METHYLHYDROCORTISONE 21-ACETATE (A) *16β - methyl-4,9-pregnadiene-17α,21-diol-3,20-dione 21-acetate.*—To a solution of 16β-methylhydrocortisone 21-acetate (0.3 g.), prepared as in Example 4, in 5 ml. of pyridine there is added 0.2 ml. of benzenesulfonyl chloride in 3 ml. of pyridine. The solution is allowed to stand for 4 hours, then is poured into ice-hydrochloric acid. A solid precipitate which is filtered and crystallized from acetone-hexane to give 16β-methyl-4,9-pregnadiene-17α,21-diol-3,20-dione 21-acetate, $$\lambda_{max.}^{MeOH} \ 239 \ m\mu \ (\epsilon 16,020)$$

(B) *9α-bromo-16β-methylhydrocortisone 21-acetate.*—A suspension of 0.2 g. of the 16β-methyl-4,9-pregnadiene of above Example 12A in 20 ml. of purified dioxane, 2 ml. of water and containing 0.1 g. of N-bromoacetamide and 1 ml. of 1.5 N perchloric acid is gently agitated for two hours. During this time the mixture becomes homogeneous. A solution of 0.2 g. of sodium sulfite in 2 ml. of water is then added, and the solution extracted with methylene chloride. The organic extracts are washed with water, dried and evaporated to a solid residue which is crystallized from acetone to give 9α-bromo-16β-methylhydrocortisone 21-acetate, $$\lambda_{max.}^{MeOH} \ 243 \ m\mu \ (\epsilon 16,100)$$

Example 13

9α-BROMO-16β-METHYLHYDROCORTISONE

A mixture of 0.5 g. of 9α-bromo-16β-methylhydrocortisone 21-acetate, prepared as in Example 12 in 100 ml. of methanol, 20 ml. of chloroform, 5 ml. of water and 5 ml. of concentrated hydrochloric acid is allowed to stand 48 hours at room temperature. Water is then added, and the mixture extracted with methylene chloride. The organic extracts are washed with water, dried and concentrated to a residue. Crystallization of this residue from acetone yields 9α-bromo-16β-methylhydrocortisone.

Example 14

9α-FLUORO-16β-METHYLHYDROCORTISONE 21-ACETATE (A) *9β,11β - oxido - 16β - methyl - 4 - pregnene - 17α, 21 - diol 3,20 - dione 21 - acetate.*—To 9α-bromo-16β-methylhydrocortisone 21-acetate (0.3 g.), prepared as in Example 12, in 20 ml. of methanol there is added 0.3 g. of potassium acetate. The mixture is refluxed for 2 hours, then concentrated in vacuo to a residue. Water is added to the residue, and a solid separates which is filtered and crystallized from methanol-water to give 0.1 g. of 9β,11β-oxido - 16β - methyl - 4 - pregnene - 17α,21 - diol 3,20-dione 21 - acetate.

(B) *9α - fluoro - 16β - methylhydrocortisone 21 - acetate.*—A solution 0.2 g. of the 9β,11β-oxido-4-pregnene of above Example 14A in 10 ml. of alcohol-free chloroform is saturated with anhydrous hydrogen fluoride at 0° C. The mixture is allowed to stand 4 hours at 0° C., then concentrated to a residue in vacuo. Crystallization of the residue from acetone-hexane gives 0.1 g. 9α-fluoro-16β-methylhydrocortisone 21-acetate.

Example 15

9α-CHLORO-16β-METHYLHYDROCORTISONE 21-ACETATE

A solution of 0.2 g. of the 9β,11β-oxido-4-pregnene of Example 14A in 30 ml. of alcohol-free chloroform is saturated at 0° C. with anhydrous hydrogen chloride, and the mixture allowed to stand at 0° C. for six hours. The solvent is distilled in vacuo from the reaction mixture leaving a residue which, when crystallized from acetone-water gives 0.2 g. of 9α-chloro-16β-methylhydrocortisone, $$\lambda_{max.}^{MeOH} \ 241 \ m\mu \ (\epsilon 16,600)$$

Example 16

9α-FLUORO-16β-METHYLHYDROCORTISONE

In the manner described in Example 13, 9α-fluoro-16β-methylhydrocortisone 21-acetate, prepared as in Example 14, is converted to 9α-fluoro-16β-methylhydrocortisone by means of hydrochloric acid in methanol-chloroform-water.

Example 17

9α-BROMO-16α-METHYLHYDROCORTISONE 21-ACETATE (A) *16α - methyl - 4,9 - pregnadiene - 17α,21 - diol - 3, 20 - dione 21 - acetate.*—16α - methylhydrocortisone 21-acetate (0.2 g.), prepared as in Example 8, is dissolved in 3 ml. of pyridine and 0.1 ml. of benzenesulfonyl chloride in 2 ml. of pyridine is added. The solution is allowed to stand for 4 hours, then is poured into ice-hydrochloric acid. A solid precipitates which is filtered and crystallized from acetone to give 16α-methyl-4,9-pregnadiene-17α,21-diol-3,20-dione 21-acetate, $$\lambda_{max.}^{MeOH} \ 238 \ m\mu \ (\epsilon 16,300)$$

(B) *9α - bromo - 16α-methylhydrocortisone 21 - acetate.*—A suspension of 0.2 g. of the 16α-methylpregnadiene of Example 17A in 20 ml. of purified dioxane, 2 ml. of water and containing 0.08 g. of N-bromoacetamide and 0.8 ml. of 1.5 N perchloric acid is gently agitated for two hours. During this time the mixture becomes homogeneous. A solution of 0.2 g. of sodium sulfite in 4 ml. of water is added, then the solution is extracted with methylene chloride. The organic extracts are washed with water, dried, filtered and evaporated to a residue which is crystallized from methanol to yield 0.1 g. of 9α-bromo-16α-methylhydrocortisone 21-acetate, $$\lambda_{max.}^{MeOH} \ 242 \ m\mu \ (\epsilon 16,400)$$

Example 18

9α-FLUORO-16α-METHYLHYDROCORTISONE (A) *9β,11β - oxido - 16α - methyl - 4 - pregnene - 17α, 21 - diol 3,20 - dione 21 - acetate.*—A mixture of 0.3 g. of 9α-bromo-16α-methylhydrocortisone 21-acetate, prepared as in Example 17, in 20 ml. of methanol and 0.3 g. of potassium acetate is refluxed for 2 hours, then concentrated to a residue. Water is added to the residue, and a solid separates which is filtered and crystallized from methanol to give 0.1 g. of 9β,11β-oxido-16α-methyl-4-pregnene-17α,21-diol 3,20-dione 21-acetate.

(B) *9α - fluoro - 16α - methylhydrocortisone 21 - acetate.*—A solution of 0.2 g. of the 9β,11β-oxido-16α-methyl-4-pregnene of above Example 18A in 10 ml. of alcohol-free chloroform is saturated with anhydrous hydrogen fluoride at 0° C. The mixture is allowed to stand 5 hours at 0° C., then concentrated to a residue under reduced pressure. Crystallization of the residue from acetone-hexane yields 0.1 g. of 9α-fluoro-16α-methylhydrocortisone 21-acetate, $$\lambda_{max.}^{MeOH} \ 238 \ m\mu \ (\epsilon 16,200)$$

(C) *9α - fluoro - 16α - methylhydrocortisone.*—In the manner described in Example 13, the 21-acetate ester prepared in Example 18B, is converted to the free alcohol, 9α-fluoro-16α-methylhydrocortisone, by means of hydrochloric acid in methanol-chloroform-water.

Example 19

16β-n-BUTYLCORTISONE 21-ACETATE (A) *17 - bromo - 16α - n - butylpregnane - 3α - ol - 11, 20 - dione.*—One gram of 16α-n-butylpregnane-3α-ol-11,20-dione, prepared as in Example 9A, is dissolved in 10 ml. of acetic acid and is then brominated with 1.1 equivalents of bromine in acetic acid. When the bromine color is discharged, the solution is poured into water and there is precipitated a solid of substantially 17-bromo-16α-n-butylpregnane-3α-ol-11,20-dione. This 17-bromo-product is filtered and used in the next procedure without further purification.

(B) *16 - n - butyl - 16 - pregnene - 3α - ol - 11,20-dione.*—To the 17-bromo-16α-n-butylpregnane prepared in above Example 19A there is added 10 ml. of dimethylformamide, and the reaction mixture is refluxed two hours. The solution is poured into dilute hydrochloric acid and then extracted with methylene chloride. The organic extracts are washed with water, dried over magnesium sulfate, filtered, and evaporated in vacuo to a residue of substantially 16-n-butyl-16-pregnene-3α-ol-11,20-dione which is used without further purification in the reaction procedure immediately following.

(C) *16β - n - butylpregnane - 3α - ol - 11,20 - dione.*—The 16-n-butyl-16-pregnene-3α-ol-11,20-dione, prepared in above Example 19B, is dissolved in 10 ml. of acetic acid and hydrogenated using palladium on charcoal as catalyst. When one equivalent of hydrogen is absorbed, the reaction is stopped, the catalyst removed by filtration, and the filtrate poured into water. A solid precipitates which is filtered and crystallized from acetone-hexane to give 16β-n-butylpregnane-3α-ol-11,20-dione.

(D) *16β - n - butylpregnane - 3α,17α - diol - 11,20 - dione.*—In the manner described in Example 1D, 16β-n-butylpregnane-3α-ol-11,20-dione, prepared as in Example 19C, is reacted first with p-toluene-sulfonic acid in acetic anhydride, then with sodium acetate in 40% peracetic acid, and finally with aqueous sodium hydroxide. The resulting product is isolated and purified in the manner of Example 1D to yield 16β-n-butylpregnane-3α,17α-diol-11,20-dione.

(E) *16β - n - butylpregnane - 3α,17α,21 - triol - 11,20-dione 21 - acetate.*—The 16β-n-butylpregnane of Example 19D is reacted first with bromine in chloroform, then with sodium acetate and dimethylformamide and the product isolated and purified in the manner described in Example 1E, to give 16β-n-butylpregnane-3α,17α,21-triol-11,20-dione 21-acetate.

(F) *16β - n - butylpregnane - 17α,21 - diol - 3,11,20-trione 21-acetate.*—In the manner described in Example 1F, 16β-n-butylpregnane-3α,17α,21-triol-11,20-dione 21-acetate is brominated and the resulting product isolated and purified to give 16β-n-butylpregnane-17α,21-diol-3,11,20-trione 21-acetate.

(G) *4 - bromo - 16β - n - butylpregnane - 17α,21 - diol - 3,11,20 - trione 21 - acetate.*—16β-n-butylpregnane-17α,21-diol-3,11,20-trione 21-acetate is brominated in the manner of Example 1G, to obtain 4-bromo-16β-n-butylpregnane-17α,21-diol-3,11,20-trione 21-acetate.

(H) *16β - n - butylcortisone 21 - acetate.*—The 4-bromo-derivative of above Example 1G is dehydrobrominated by means of semicarbazide and aqueous 80% acetic acid and 70% pyruvic acid in the manner of Example 1H to obtain 16β-n-butylcortisone 21-acetate.

$\lambda_{max.}^{MeOH}$ 238 mμ (ε 14,000)

*Example 20*

16β-n-BUTYLCORTISONE

16β-n-butylcortisone 21-acetate is hydrolyzed by means of aqueous alcoholic potassium bicarbonate in the manner described in Example 2 to yield 16b-n-butylcortisone, $\lambda_{max.}^{MeOH}$ 238 mμ (ε 15,000)

*Example 21*

16β-METHYLPREDNISONE 21-ACETATE (A) *2,4-dibromo-16β-methylpregnane - 17α,21 - diol-3,11,20-trione 21-acetate.*—A solution of 167 mg. 16β-methylpregnane-17α,21-diol-3,11,20-trione 21-acetate, the compound of Example 1F, in 3 ml. of dioxane is dibrominated in positions 2 and 4 by the rapid addition of 130 mg. of bromine in 1 ml. of dioxane at room temperature. The solution is poured into water and the precipitated solid is filtered, yielding 180 mg. of 2,4-dibromo-16β-methylpregnane-17α,21-diol-3,11,20 - trione 21-acetate of sufficient purity to be used in the conversion described in the following procedure.

(B) *16β-methylprednisone 21-acetate.*—The 2,4-dibromide (180 mg.) as prepared in above Example 21A is dehydrobrominated by refluxing for 2 hours with 4 ml. of dimethylformamide containing 30 mg. of calcium carbonate. The mixture is poured into dilute hydrochloric acid and extracted with methylene chloride. The organic extract is evaporated to a residue (150 mg.), which is chromatographed on Florisil. The fractions obtained by elution with 20% ether-hexane are crystallized from acetone-hexane to give 40 mg. of 16β-methylprednisone 21-acetate, M.P. 210–216°. One further crystallization gave M.P. 215–218°, $\lambda_{max.}^{MeOH}$ 237 mμ (ε 13,500)

*Example 22*

16β-METHYLPREDNISONE

16β-methylprednisone 21-acetate (0.5 g.), the compound of Example 21, when hydrolyzed by means of aqueous alcoholic potassium bicarbonate in the manner described in Example 2 yields 16β-methylprednisone.

An alternative method of the preparation of the compound of this example is as follows:

*Bacillus sphaericus* var. *fusiformis* (A.T.C.C. 7055) is incubated on a nutrient agar (composed of Bacto-beef extract, 3 g.; Bacto-peptone, 5 g.; sodium chloride, 8 g.; agar, 15 g.; tap water, 1 liter) for 24 hours at 28° C.

To 100 ml. of a sterile nutrient broth (composed of Bacto-Beef extract, 3 g.; Bacto-peptone, 5 g.; per liter of tap water) in a 300 ml. flask is added one loopful of the incubated culture and the broth mixture is further incubated for 24 hours at 28° C. on a shaking machine. The broth culture so obtained is employed as an inoculum (1%).

Into each of ten flasks containing 100 ml. of sterile nutrient broth is added 1 ml. of the inoculum. The flasks are agitated on a rotary shaker for 8 hours at 28° C. at 240 strokes per minute. After this growth period, a solution of 25 mg. of 16β-methylcortisone, the compound of Example 2, in 0.5 ml. of methanol is aseptically added to each flask which in turn is re-shaken and incubated for an additional 24 hours. The final pH is 7.8.

The contents of the flasks are then combined and extracted three times with 2 liters of chloroform per extraction. The combined chloroform extracts are evaporated to dryness yielding 310 mg. of crude product. The crude steroid is purified by chromatography on a chromatographic system described by G. M. Shull, Abstracts of Papers of the 126th Meeting of the American Chemical Society, December 12–17, 1954, page 9a, paper No. 24. Chromatographic evaluation shows a quantitative conversion of the starting material to the diene when an authentic sample of the 16β-methylprednisone is used as a control.

Alternatively, the crude product is recrystallized from acetone affording 225 mg. of 16β-methylprednisone.

*Example 23*

16β-METHYLPREDNISOLONE

16β-methylhydrocortisone, the compound of Example 3, is fermented by means of *Bacillus sphaericus* var. *fusiformis* (A.T.C.C. 7055) in the manner described in the alternate procedure of Example 22 to produce 16β-methylprednisolone.

*Example 24*

16β-METHYLPREDNISOLONE 21-ACETATE

16β-methylprednisolone of Example 23, is treated with acetic acid and pyridine in the manner described in Example 4 to yield 16β-methylprednisolone 21-acetate.

*Example 25*

16α-METHYLPREDNISONE 21-ACETATE

A solution of 40 mg. of 17α,21-dihydroxy-16α-methylpregnane-3,11,20-trione 21-acetate, the compound of Example 5D, in 2 ml. of dioxane is dibrominated by the rapid addition of 32 mg. of bromine in 1 ml. of dioxane. Water is added and the mixture extracted with methylene chloride. The solvent is dried over magnesium sulfate, filtered and distilled under reduced pressure. The resulting residue (55 mg.) is refluxed with 2 ml. of dimethylformamide and 10 mg. of calcium carbonate for two hours, then poured into ice water containing 2 ml. of concentrated hydrochloric acid. The mixture is extracted with methylene chloride, the organic extracts are washed with dilute sodium bicarbonate solution and water, then evaporated to a residue which is chromatographed on Florisil to give 15 mg. of 16α-methylprednisone 21-acetate, λ max. 238 mμ (ε 14,000).

*Example 26*

16α-METHYLPREDNISONE

In the manner described in Example 6, 0.3 g. of 16α-methylprednisone 21-acetate is hydrolyzed by means of aqueous alcoholic potassium bicarbonate to produce 16α-methylprednisone.

*Example 27*

16α-METHYLPREDNISONE 21-PROPIONATE

16α-methylprednisone, the compound of Example 26, is reacted with propionic anhydride in pyridine in the manner of Example 4 to yield 16α-methylprednisone 21-propionate.

Example 28

16α-METHYLPREDNISOLONE

*Bacillus sphaericus* var. *fusiformis* (A.T.C.C. 7055) is incubated on a nutrient agar (composed of Bacto-beef extract, 3 g., Bacto-peptone, 5 g., sodium chloride, 8 g., agar, 15 g., tap water, 1 liter) for 24 hours at 28° C. To 100 ml. of sterile nutrient broth (composed of Bacto-beef extract, 3 g., Bacto-peptone, 5 g., per liter of tap water) in 300 ml. flask is added one loopful of the incubated culture and the broth mixture is further incubated for 24 hours at 28° C. on a shaking machine. The broth culture so obtained is employed as an inoculum (1%).

Into each of ten flasks containing 100 ml. of sterile nutrient broth is added 1 ml. of the inoculum. The flasks are agitated on a rotary shaker for 8 hours at 28° C. at 240 strokes per minute. After this growth period, a solution of 25 mg. of 16α-methylhydrocortisone, the compound of Example 7, in 0.5 ml. of methanol is aseptically added to each flask which, in turn, is reshaken and incubated for an additional 24 hours. The final pH is 7.8.

The contents of the flasks are combined and extracted three times with 2 liters of chloroform per extraction. The combined chloroform extracts are evaporated to dryness yielding 310 mg. of a residue which is crystallized from acetone-hexane to give 16α-methylprednisolone.

Example 29

16α-METHYLPREDNISOLONE 21-ACETATE

A solution of 100 mg. of 16α-methylprednisolone in 2 ml. of pyridine containing 100 mg. of acetic anhydride is allowed to stand for 1 hour. The mixture is then poured into ice-HCl and a precipitate results which is removed by filtration. Crystallization of the precipitate from aqueous methanol gives 16α-methylprednisolone 21-acetate.

Example 30

9α-BROMO-16β-METHYLPREDNISOLONE 21-ACETATE (A) *16β-methyl-1,4,9(11)-pregnatriene-17α,21-diol-3,20-dione 21-acetate.*—A solution of 0.5 g. of 16β-methylprednisolone 21-acetate, the compound of Example 24, in 3 ml. of pyridine is reacted with 0.3 ml. of methanesulfonyl chloride in 4 ml. of pyridine. The solution is allowed to stand for 6 hours, then poured into ice-hydrochloric acid. A solid precipitate which is removed by filtration and crystallized from acetone-hexane to give 16β-methyl-1,4,9(11)-pregnatriene-17α,21-diol-3,20-dione 21-acetate, $\lambda_{max.}^{MeOH}$ 238 m$\mu$ ($\epsilon$14,750)

(B) *9α-bromo-16β-methylprednisolone 21-acetate.*—A suspension of 0.5 g. of the 16β-methylpregnatriene of above Example 30A in 50 ml. of purified dioxane in a 5 ml. of water containing 0.2 g. of N-bromoacetamide and 2 ml. of 1.5 N perchloric acid is gently agitated for a period of two hours, during which time the mixture becomes homogeneous. A solution of 0.5 g. of sodium sulfite in 5 ml. of water is added, and the reaction mixture is extracted with methylene chloride. The organic extracts are washed with water, dried over magnesium sulfate, filtered and evaporated. The resulting solid is crystallized from acetone to yield 0.3 g. of 9α-bromo-16β-methylpregnisolone 21-acetate, $\lambda_{max.}^{MeOH}$ 242 m$\mu$, ($\epsilon$14,950)

Example 31

9α-FLUORO-16β-METHYLPREDNISOLONE 21-ACETATE (A) *9β,11β-oxido-16β-methyl-1,4-pregnadiene-17α,21-diol-3,20-dione 21-acetate.*—One gram of 9α-bromo-16β-methylprednisolone 21-acetate, the compound of Example 30, is added to 65 ml. of methanol and 1.0 g. of potassium acetate and the mixture is refluxed for 2 hours, then concentrated to a residue. Water is added to the residue and the resulting solid is removed by filtration and crystallized from methanol-water to yield 0.6 g. of 9β,11β-oxido-16β-methyl-1,4-pregnadiene-17α,21-diol-3,20-dione 21-acetate, $\lambda_{max.}^{MeOH}$ 242 m$\mu$, ($\epsilon$13,850)

(B) *9α-fluoro-16β-methylprednisolone 21-acetate.*—A solution of 0.4 g. of the 9β,11β-oxido-1,4-pregnadiene of Example 31A in 20 ml. of alcohol-free chloroform is saturated with anhydrous hydrogen fluoride at 0° C. The mixture is allowed to stand 4 hours at 0° C., then concentrated to a residue under reduced pressure. Crystallization of the residue from acetone-hexane gives 0.2 g. 9α-fluoro-16β-methylprednisolone 21-acetate, $\lambda_{max.}^{MeOH}$ 238 m$\mu$ ($\epsilon$15,100)

Example 32

9α-FLUORO-16β-METHYLPREDNISOLONE

9α-fluoro-16β-methylprednisolone 21-acetate, the compound of Example 31, is converted to 9α-fluoro-16β-methylprednisolone by means of hydrochloric acid in methanol-chloroform-water in the manner described in Example 13.

Example 33

9α-BROMO-16β-METHYLPREDNISOLONE

9α-bromo-16β-methylprednisolone 21-acetate, the compound of Example 30, is converted to 9α-bromo-16β-methylprednisolone in the manner of Example 13 using hydrochloric acid in methanol-chloroform-water.

Example 34

9α-CHLORO-16β-METHYLPREDNISOLONE 21-ACETATE

A solution of 0.3 g. of 9β,11β-oxido-16β-methyl-1,4-pregnadiene-17α,21-diol-3,20-dione 21-acetate, the compound of Example 31A, in 40 ml. of alcohol-free chloroform is saturated at 0° C. with anhydrous hydrogen chloride, and the mixture allowed to stand at 0° C. for 6 hours. The mixture is concentrated under reduced pressure to a residue which is crystallized from acetone-water to give 0.2 g. of 9α-chloro-16β-methylprednisolone 21-acetate, $\lambda_{max.}^{MeOH}$ 240 m$\mu$ ($\epsilon$15,000)

Example 35

9α-CHLORO-16β-METHYLPREDNISOLONE

In the manner of Example 13, 9α-chloro-16β-methylprednisolone 21-acetate is converted to 9α-chloro-16β-methylprednisolone.

Example 36

9α-FLUORO-16β-METHYLPREDNISONE 21-ACETATE

To a solution of 0.3 g. of 9α-fluoro-16β-methylprednisolone 21-acetate, the compound of Example 31, in 15 ml. of acetic acid is added dropwise a solution of 60 mg. of chromium trioxide in 1 ml. of water and 3 ml. of acetic acid. The resulting mixture is allowed to stand 5 hours, then idluted with water and extracted with methylene chloride. The organic extracts are washed with water, dried over magnesium sulfate, filtered and evaporated in a residue which is crystallized from methanol to give 0.1 g. of 9α-fluoro-16β-methylprednisone 21-acetate.

Example 37

9α-FLUORO-16β-METHYLPREDNISONE

In the manner described in Example 13, 9α-fluoro-16β-methylprednisone 21-acetate is hydrolyzed to 9α-fluoro-16β-methylprednisone by means of HCl in methanol-chloroform-water.

Example 38

9α-CHLORO-16β-METHYLPREDNISONE (A) *9α-chloro-16β-methylprednisone 21-acetate.*—9α-chloro-16β-methylprednisolone 21-acetate, the compound of Example 34, is reacted with chromium rtioxide in aqueous acetic acid in the manner of Example 36 to give 9α-chloro-16β-methylprednisone 21-acetate.

(B) *9α-chloro-16β-methylprednisone.*—In the manner described in Example 13, the 21-acetate ester of Example 38A is reacted with hydrochloric acid in methanol-chloroform-water to give 9α-chloro-16β-methylprednisone.

Example 39
9α-BROMO-16β-METHYLPREDNISONE (A) *9α-bromo-16β-methylprednisone 21-acetate.*—9α-bromo-16β-methylprednisolone 21-acetate, the compound of Example 30, is reacted with chromium trioxide in aqueous acetic acid in the manner of Example 36 to give 9α-bromo-16β-methylprednisone 21-acetate.

(B) *9α-bromo-16β-methylprednisone.*—In the manner of Example 13, the 21-acetate ester of Example 39A is reacted with hydrochloric acid in methanol-chloroform-water to give 9α-bromo-16β-methylprednisone.

Example 40
9α-BROMO-16α-METHYLPREDNISOLONE (A) *16α-methyl-1,4,9(11)-pregnatriene-17α,21-diol-3,20-dione 21-acetate.*—A solution of 0.3 g. of 16α-methylprednisolone 21-acetate, the compound of Example 29, in 2 ml. of pyridine is reacted with 0.1 ml. of methanesulfonyl chloride in 2 ml. of pyridine. The solution is allowed to stand for five hours, then poured into ice-hydrochloric acid. A solid precipitates which is filtered and crystallized from acetone to give 16α-methyl-1,4,9(11)-pregnatriene-17α,21-diol-3,20-dione 21-acetate, $$\lambda_{max.}^{MeOH}\ 238\ m\mu,\ (\epsilon 15,200)$$

(B) *9α-bromo-16α-methylprednisolone 21-acetate.*—A suspension of 0.3 g. of the 16α-methyl-1,4,9(11)-pregnatriene of Example 40A in 30 ml. of purified dioxane, 3 ml. of water containing 0.1 g. of N-bromoacetamide and 1 ml. of 1.5 N perchloric acid is gently agitated for a period of two hours, during which time the mixture becomes homogeneous. A solution of 0.3 g. of sodium sulfite in 5 ml. of water is added, then the solution extracted with methylene chloride. The organic extracts are washed with water, dried over magnesium sulfate, filtered and evaporated. The resulting solid residue is crystallized from methanol to yield 0.2 g. of 9α-bromo-16α-methylprednisolone 21-acetate, $$\lambda_{max.}^{MeOH}\ 243\ m\mu,\ (\epsilon 14,800)$$

(C) *9α-bromo-16α-methylprednisolone.*—In the manner of Example 13, 9α-bromo-16α-methylprednisolone 21-acetate is reacted with hydrochloric acid in chloroform-methanol-water to give 9α-bromo-16α-methylprednisolone.

Example 41
9α-FLUORO-16α-METHYLPREDNISOLONE (A) *9β,11β-oxido-16α-methyl-1,4-pregnadiene-17α,21-diol-3,20-dione 21-acetate.*—A mixture of 0.5 g. of 9α-bromo-16α-methylprednisolone 21-acetate, the compound of Example 40B, 30 ml. of methanol and 0.5 g. of potassium acetate is refluxed for 2 hours, then concentrated to a residue. Water is added to the residue and the resulting solid is filtered and crystallized from methanol to give 0.3 g. of 9β,11β-oxido-16α-methyl-1,4-pregnadiene-17α,21-diol-3,20-dione 21-acetate, $$\lambda_{max.}^{MeOH}\ 243\ m\mu\ (\epsilon 14,050)$$

(B) *9α-fluoro-16α-methylprednisolone 21-acetate.*—A solution of 0.2 g. of the 9β,11β-oxido-16α-methylpregnadiene of above Example 41A in 10 ml. of alcohol-free chloroform is saturated with anhydrous hydrogen fluoride at 0° C. The mixture is allowed to stand 5 hours at 0° C., then concentrated to a residue under reduced pressure. Crystallization of the residue from acetone-hexane gives 0.15 g. of 9α-fluoro-16α-methylprednisolone 21-acetate, $$\lambda_{max.}^{MeOH}\ 238\ m\mu\ (\epsilon 15,200)$$

(C) *9α-fluoro-16α-methylprednisolone.*—According to the procedure of Example 13 using hydrochloric acid in chloroform-methanol-water, 9α-fluoro-16α-methylprednisolone 21-acetate is converted to 9α-fluoro-16α-methylprednisolone.

Example 42
9α-CHLORO-16α-METHYLPREDNISOLONE (A) *9α-fluoro-16α-methylprednisolone 21-acetate.*—A solution of 0.2 g. of the 9β,11β-oxido-pregnadiene of Example 41A in 30 ml. of alcohol-free chloroform is saturated at 0° C. with anhydrous hydrogen chloride, and the mixture allowed to stand at this temperature for 6 hours. The mixture is concentrated under reduced pressure to a residue which is crystallized from acetone-hexane to give 0.15 g. of 9α-chloro-16α-methylprednisolone 21-acetate.

$$\lambda_{max.}^{MeOH}\ 241\ m\mu,\ (\epsilon 15,250)$$

(B) *9α-chloro-16α-methylprednisolone.*—According to the procedure of Example 13 using hydrochloric acid in chloroform-methanol-water, the 21-acetate compound of Example 42A is converted to 9α-chloro-16α-methylprednisolone.

Example 43
9α-FLUORO-16α-METHYLPREDNISONE (A) *9α-fluoro-16α-methylprednisone 21-acetate.*—To a solution of 0.2 g. of 9α-fluoro-16α-methylprednisolone 21-acetate, the compound of Example 41B, 10 ml. of acetic acid there is added dropwise a solution of 40 mg. of chromium trioxide in 1 ml. of water and 2 ml. of acetic acid. The resulting mixture is allowed to stand 6 hours, then diluted with water and extracted with methylene chloride. The organic extracts are washed with water, dried over magnesium sulfate, filtered and evaporated to a residue which is crystallized from methanol to give 0.1 g. of 9α-fluoro-16α-methylprednisone 21-acetate, $$\lambda_{max.}^{MeOH}\ 237\ m\mu\ (\epsilon 14,000)$$

(B) *9α-fluoro-16α-methylprednisone.*—In the manner of Example 13, the 21-acetate ester of Example 43 is hydrolyzed to 9α-fluoro-16α-methylprednisone.

Example 44
9α-CHLORO-16α-METHYLPREDNISONE

In the manner described in Example 43, 9α-chloro-16α-methylprednisolone 21-acetate, the compound of Example 42A, is reacted with chromium trioxide to yield 9α-chloro-16α-methylprednisone 21-acetate.

In the manner described in Example 13, the 21-acetate ester of the compound of this example is reacted with hydrochloric acid in chloroform-methanol-water to yield 9α-chloro-16α-methylprednisone.

Example 45
9α-BROMO-16α-METHYLPREDNISONE

In the manner described in Example 43, 9α-bromo-16α-methylprednisolone 21-acetate, the compound of Example 40B, is reacted with chromium trioxide to yield 9α-bromo-16α-methylprednisone 21-acetate.

In turn, the 21-acetate of the compound of this example is converted to the free alcohol, 9α-bromo-16α-methylprednisone, by means of hydrochloric acid in chloroform-methanol-water according to the procedure of Example 13.

Example 46
9α-CHLORO-16α-METHYLHYDROCORTISONE

In the manner described in Example 42, 9β,11β-oxido-16α-methyl-4-pregnene-17α,21-diol 21-acetate, the compound of Example 18A, is reacted with hydrogen chloride in chloroform to give 9α-chloro-16α-methylhydrocortisone 21-acetate, $$\lambda_{max.}^{MeOH}\ 242\ m\mu,\ (\epsilon 16,400)$$

The 21-acetate of the compound of this example is hydrolyzed by means of hydrochloric acid in chloroform-methanol-water according to the procedure of Example 13, to obtain 9α-chloro-16α-methylhydrocortisone.

Example 47

9α-CHLORO-16α-METHYLCORTISONE

In the manner described in Example 36, 9α-chloro-16α-methylhydrocortisone 21-acetate is reacted with chromium trioxide in water and acetic acid to yield 9α-chloro-16α-methylcortisone 21-acetate, $\lambda_{max.}^{MeOH}$ 239 m$\mu$ ($\epsilon$15,100)

The 21-acetate of the compound of this example is hydrolyzed by means of hydrochloric acid in chloroform-methanol-water according to the procedure of Example 13 to give 9α-chloro-16α-methylcortisone.

Example 48

9α-FLUORO-16α-METHYLCORTISONE

In the manner described in Example 36, 9α-fluoro-16α-methylhydrocortisone 21-acetate, the compound of Example 18B, is reacted with chromium trioxide in water and acetic acid to yield 9α-fluoro-16α-methylcortisone 21-acetate, $\lambda_{max.}^{MeOH}$ 237 m$\mu$ ($\epsilon$15,000)

In the manner of Example 13, the 21-acetate of the compound of this example is hydrolyzed with hydrochloric acid in chloroform-methanol-water to yield 9α-fluoro-16α-methylcortisone.

Example 49

9α-BROMO-16α-METHYLCORTISONE

In the manner described in Example 36, 9α-bromo-16α-methylhydrocortisone 21-acetate, the compound of Example 17B, is reacted with chromium trioxide in aqueous acetic acid to give 9α-bromo-16α-methylcortisone 21-acetate, $\lambda_{max.}^{MeOH}$ 241 m$\mu$ ($\epsilon$14,700)

The 21-acetate of the compound of this example is hydrolyzed by means of hydrochloric acid in methanol-water-chloroform in the manner described in Example 13 to give 9α-bromo-16α-methylcortisone.

Example 50

16α-ETHYLCORTISONE 21-ACETATE

By performing the sequence of reactions described in Example 9 (A–F), 16-pregnene-3α-ol-11,20-dione is first reacted with ethyl iodide and magnesium to yield the requisite intermediate, 16α-ethylpregnane-3α-ol-11,20-dione which, in turn, is ultimately converted to 16α-ethylcortisone 21-acetate which compound is isolated and purified in the manner described in Example 9F.

Example 51

16α-ETHYLCORTISONE

16α-ethylcortisone 21-acetate, the compound of Example 50, when hydrolyzed by means of aqueous potassium bicarbonate in the manner described in Example 2, yields 16α-ethylcortisone.

Example 52

16α-ETHYLPREDNISONE

16α-ethylcortisone, the compound of Example 51, is subjected to the action of *Bacillus sphaericus* var. *fusiformis* and the product isolated and purified in the manner described in Example 22 to give 16α-ethylprednisone.

Example 53

16α-ETHYLHYDROCORTISONE

16α-ethylcortisone 21-acetate is converted to the bis-semicarbazone derivative and thence the 16α-ethylhydrocortisone in the manner described in Example 7.

Example 54

16α-ETHYLPREDNISOLONE

16α-ethylhydrocortisone is subjected to the action of *Bacillus sphaericus* var. *fusiformis* and the resulting product isolated and purified in the manner described in Example 22 to give 16α-ethylprednisolone.

The 21-acetate of 16α-ethylprednisolone is prepared from the free alcohol and acetic anhydride and pyridine in the manner described in Example 29.

Example 55

9α-BROMO-16α-ETHYLPREDNISOLONE

16α-ethylprednisolone 21-acetate is converted to 9α-bromo-16α-ethyl-prednisolone 21-acetate and thence to the corresponding 21-alcohol by going through the sequence of reactions described in Example 4D.

Example 56

9α-FLUORO-16α-ETHYLPREDNISOLONE

The 9α-bromo-16α-ethylprednisolone 21-acetate of Example 55 is converted to 9β,11β-oxido-16α-ethylprednisolone and thence to 9α-fluoro-16α-ethylprednisolone 21-acetate and the corresponding 21-alcohol in the manner described in Example 41.

Example 57

9α-FLUORO-16α-ETHYLPREDNISONE 21-ACETATE

In the manner described in Example 36, 9α-fluoro-16α-ethylprednisolone 21-acetate is reacted with chromium trioxide in aqueous acetic acid to give 9α-fluoro-16α-ethylprednisone 21-acetate.

What is claimed is:

1. The pregnene having a keto group at the 3- and 20-positions, hydroxy at the 17α-position, a member of the group consisting of hydroxy and pharmaceutically acceptable esters thereof at the 21-position, a member of the group consisting of hydrogen and halogen at the 9α-position and characterized by a member of the group consisting of keto and β-hydroxy at the 11-position, a lower alkyl group at the 16β-position and the presence of a double bond between positions selected from the group consisting of (4,5) and (1,2;4,5).

2. A compound of the formula:

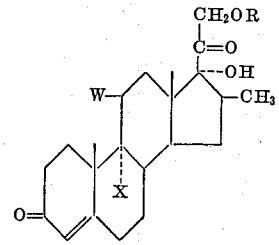

wherein X is selected from the group consisting of hydrogen and halo; W is selected from the group consisting of keto and β-hydroxy; and R is selected from the group consisting of hydrogen and lower alkanoyl.

3. A compound of the formula:

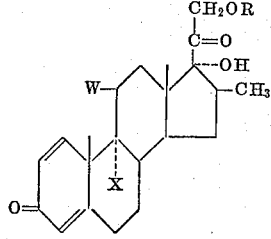

wherein X is selected from the group consisting of hydrogen and halo; W is selected from the group consisting of keto and β-hydroxy; and R is selected from the group consisting of hydrogen and lower alkanoyl.

4. 16β-lower alkyl cortisone.
5. 16β-lower alkyl hydrocortisone.
6. 16β-lower alkyl prednisone.
7. 16β-lower alkyl prednisolone.
8. 9α-halogeno-16β-lower alkyl hydrocortisone.

9. 9α-halogeno-16β-lower alkyl prednisolone.

10. A 21-pharmaceutically acceptable ester of 16β-lower alkyl cortisone.

11. A 21-pharmaceutically acceptable ester of 16β-lower alkyl hydrocortisone.

12. A 21-pharmaceutically acceptable ester of 16β-lower alkyl prednisone.

13. A 21-pharmaceutically acceptable ester of 16β-lower alkyl prednisolone.

14. A 21-pharmaceutically acceptable ester of 9α-halogeno-16β-lower alkyl hydrocortisone.

15. A 21-pharmaceutically acceptable ester of 9α-halogeno-16β-lower alkyl prednisolone.

16. 16β-methylprednisone.

17. 16β-methylprednisolone.

18. 9α-fluoro-16β-methylprednisolone.

19. A 21 - pharmaceutically acceptable ester of 16β-methylprednisone.

20. A 21 - pharmaceutically acceptable ester of 16β-methylprednisolone.

21. A 21 - pharmaceutically acceptable ester of 9α-fluoro-16β-methylprednisolone.

22. 9α-fluoro-16β-methylprednisolone 21-acetate.

23. The dihydrogen phosphate esters of the compounds of claim 1.

No references cited.

LEWIS GOTTS, *Primary Examiner*.

Notice of Adverse Decision in Interference

In Interference No. 96,052 involving Patent No. 3,164,618, R. Rausser and E. P. Oliveto, ALKYLATED STEROIDS, final judgment adverse to the patentees was rendered Apr. 4, 1969, as to claims 18 and 22.

[*Official Gazette June 3, 1969.*]